Feb. 24, 1959

W. C. MORRIS ET AL 2,875,085

CERAMIC PIGMENTS

Filed July 5, 1956

2 Sheets-Sheet 1

W. C. Morris et al INVENTORS

BY his attorney

United States Patent Office 2,875,085
Patented Feb. 24, 1959

2,875,085

CERAMIC PIGMENTS

William C. Morris, Mayfield Heights, and Adolph O. Tesar, Maple Heights, Ohio, assignors to The Harshaw Chemical Company, Cleveland, Ohio, a corporation of Ohio Application July 5, 1956, Serial No. 596,079

8 Claims. (Cl. 106—299)

This invention relates to ceramic pigments suitable for various ceramic uses, and especially for use in ceramic glazes. More particularly, the invention relates to pigments produced by calcining oxides of zirconium, silicon, vanadium and tin and/or compounds thereof which are productive of the oxides during calcination.

It is an object of the invention to provide a process for producing new compound pigments characterized in particular by their especially pleasing green colors. Although the new compound pigments of the invention may be employed in other ceramic type applications such as body stains, underglaze, etc., it will be understood that when reference is made to specific colors herein that the colors referred to unless otherwise indicated are those developed when employing the pigments in ceramic glazes as exemplified hereinafter. The colors of the actual pigments themselves will vary according to the constituent ingredients thereof, usually somewhat lighter and occasionally more bluish or yellowish than the color obtained in glaze applications.

Another object of the invention is to provide a process for producing pigments characterized in that the oxides of zirconium, silicon, vanadium and tin are the principal reactive ingredients productive thereof.

Other and further objects will be apparent from the following disclosure.

According to the invention it has been discovered that new compound pigments may be produced from mixtures of zirconium oxide, silica, vanadium oxide and tin oxide or compounds productive thereof during calcination providing the calcination is conducted at temperatures generally ranging from about 1200° C. to about 1500° C. Preferably the temperature of calcination ranges from about 1275° C. to about 1375° C. since as the temperature employed falls below about 1275° C., there is an increase in the bluish cast associated with pigmented glazes. Similarly as temperatures in excess of about 1375° C. are employed during the calcination, the color of a glaze pigmented therewith tends to shift slightly resulting in an increase in the intensity of yellow.

Figure 1:
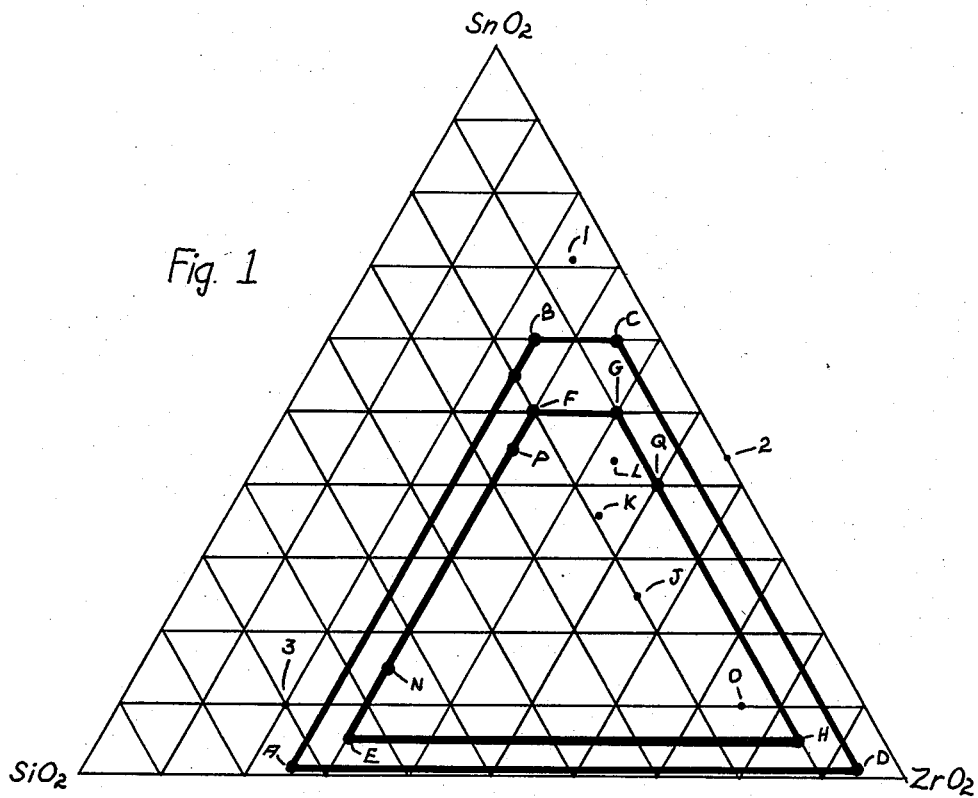

Fig. 1 is a triangular diagram broadly representing pigment compositions as regards silica, tin oxide and zirconium oxide contents falling within and without the scope of the invention described herein. In the figure, these three of the four essential ingredients of the new pigments are represented in parts by weight whereas the fourth component, namely $V_2O_5$ may be considered broadly as falling from about .75% to about 9% by weight of the other oxides. When reference is made to specific pigment formulas indicated on Figure 1 by reference points the $V_2O_5$ content may be considered as falling from about 1% to about 5% by weight of the other oxides of zirconium, tin and silicon.

Figure 2:
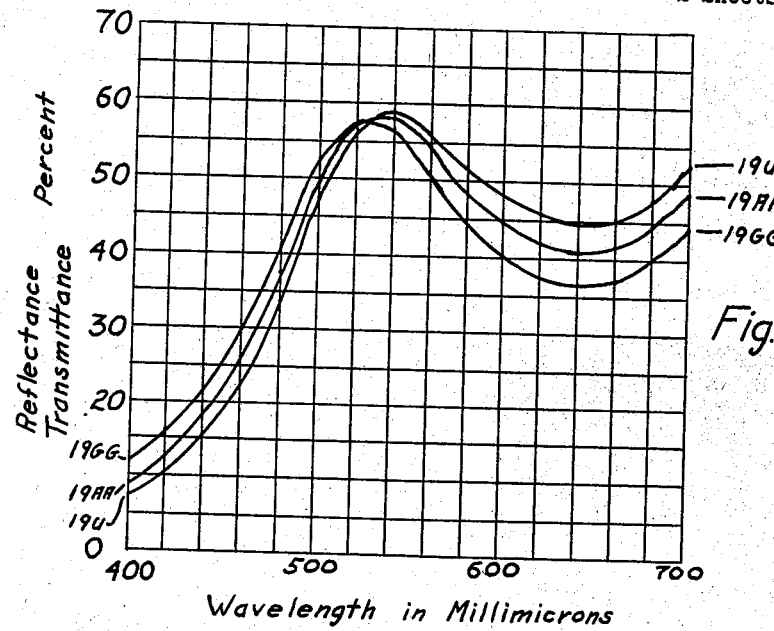
Figure 3:
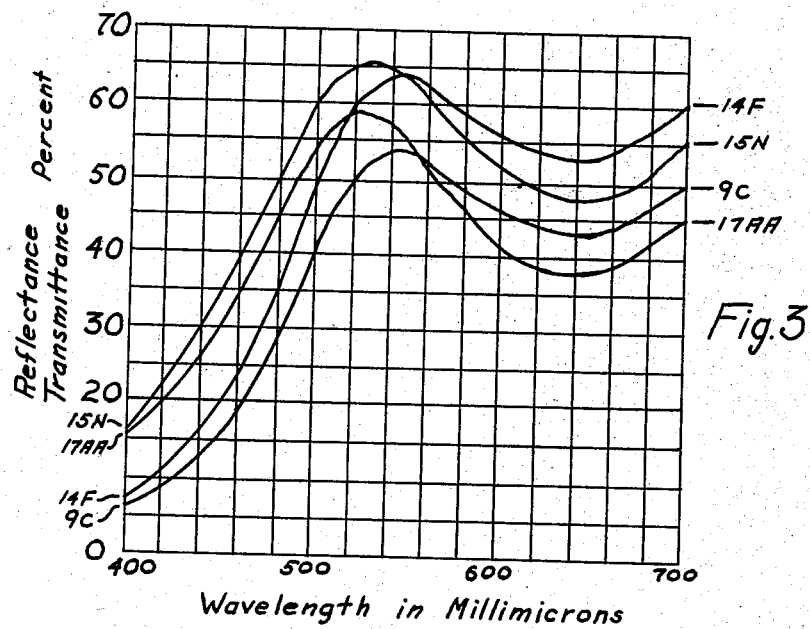

Figs. 2 and 3 are color diagrams representing the color characteristics of various specific pigment formulations falling within the scope of the invention when utilized in ceramic glazes of the type hereinafter indicated. In effect Figs. 2 and 3 represent the color characteristics of various pigment formulations utilized in ceramic glazes as indicated on a recording spectrophotometer chart.

The novel pigments falling within the broad scope of the invention may be represented by those compositions of zirconium oxide, silica and tin oxide falling within the area on Fig. 1 defined by lines A—B, B—C, C—D and D—A and which additionally have incorporated therewith $V_2O_5$ in amounts ranging from about .75% to about 9% of the aggregate weight of the other oxides. Preferably the $V_2O_5$ content of the new pigments produced according to the invention is from about 1% to about 5% by weight of the other oxides, that is, by total weight of the oxides of zirconium, silicon and tin. Numerically the compositions of the pigments according to the broad concept of the invention may be represented as having the following parts by weight of the oxides of zirconium, silicon and tin.

$ZrO_2$ from about 25 to about 94
$SiO_2$ from about 5 to about 74
$SnO_2$ from about 1 to about 60 and as additionally containing from about .75% to about 9% $V_2O_5$ by weight of the other oxides mentioned.

Preferably the compositions of the pigments according to the invention have zirconium, silicon and tin oxide on a parts by weight basis falling within the area on Fig. 1 defined by lines E—F, F—G, G—H and H—E and additionally contain between about 1% and about 5% $V_2O_5$ by weight of the other oxides. Accordingly in the preferred form the novel pigments may be represented numerically as having in addition to from about 1% to about 5% $V_2O_5$ by weight of the oxides of zirconium, silicon and tin, the relative proportions of zirconium, silicon and tin oxides in parts by weight as follows:

$ZrO_2$ from about 30 to about 85
$SnO_2$ from about 5 to about 50
$SiO_2$ from about 10 to about 65

In the compounding of the pigments it is preferable to utilize the oxides of the respective constituents especially those of zirconium, tin and silicon. However, compounds productive of the oxides during calcination such as the hydrates may be employed so long as the compounds utilized do not interfere adversely with the resulting pigment. The vanadium for example may be added in the form of ammonium vanadate or vanadium pentoxide and also as sodium vanadate. However, it is less desirable to use sodium vanadate since alkali contamination has been found to lighten the color of the pigment produced especially when present in amounts greater than about 2% or 3% based upon the combined weights of the oxide of zirconium, silicon, tin and vanadium. The zirconium oxide may be added in a relatively pure state or in commercial grades containing relatively minor amounts of contaminating constituents. The silica may be added as such in the form of flint or other commercial silica of sufficient purity. Similarly tin oxide may be brought together in the mixture in the form of the oxide or compounds of tin productive of the oxide during calcination. Care should be taken however that excessive quantities of alkali such as soda are not incorporated in the mixture since as indicated heretofore excessive quantities thereof have been found to materially lighten the color of the green pigment produced.

It is not certain what state of combination, chemical or physical, the constituent oxides take in the final pigment. Accordingly the pigments have been defined as containing certain constituent oxides without thereby intending to signify anything concerning the state of association of such oxides in the product. In any event, it appears that the various component oxides are extremely intimately combined either physically or chemically. Reference has been made to the vanadium constituent of the novel compound pigments as being in the pentavalent form in the final product although this may not be the case. It may be that the vanadium is somehow reduced to the tetra or trivalent condition during calcination or to some other form and accordingly there is no intention to be bound by a representation that the vanadium is in the pentavalent form. In any event it is convenient to represent the pigments as containing the constituent oxides indicated and it is to be understood that there is no intention to represent the actual constitution of the final product or final state of association of the constituent oxides as having been determined.

Figs. 2 and 3 are typical color curves obtained by spectrophotometric analysis of glazes utilizing pigments prepared according to the process of the herein described invention. The color curves indicated are for glazes containing pigments prepared from the ingredients set forth in Table I and which are also identified on Fig. 1 most specifically with respect to the $ZrO_2$, $SiO_2$ and $SnO_2$ contents.

Table I

| Tile No. | Pigment Identification No. | Pigmented Ingredients (gms.) | | | | Firing Conditions | |
|---|---|---|---|---|---|---|---|
| | | $SnO_2$ | $ZrO_2$ | $SiO_2$ | $NH_4VO_3$ | Temp. (°C.) | Time (Hours) |
| 19GG | J | 23.8 | 52.3 | 19.0 | 4.9 | 1,325 | 3 |
| 19AA | K | 34.5 | 43.1 | 17.9 | 4.5 | 1,325 | 3 |
| 19U | L | 41.4 | 41.4 | 12.9 | 4.3 | 1,325 | 3 |
| 15N | N | 14.3 | 28.5 | 52.3 | 4.9 | 1,325 | 3 |
| 17AA | O | 9.5 | 71.3 | 14.3 | 4.9 | 1,325 | 3 |
| 14F | P | 42.8 | 28.5 | 23.8 | 4.9 | 1,325 | 3 |
| 9C | Q | 37.9 | 47.4 | 9.8 | 4.9 | 1,325 | 3 |

Each of the pigments identified in Table I was prepared by first dry blending the indicated weighed proportions of the respective constituents and thereafter adding just enough hot water to give a wet mix of the blended ingredients. The quantity of water added was insufficient to permit separation of the ingredients. This wet mix was then dried, crushed and fired in a fire clay sagger for the period of time and at the temperature indicated in the table. The tin oxide, silica and ammonium vanadate contained relatively no contaminants whereas the zirconium oxide had the following typical analysis:

| | |
|---|---|
| $ZrO_2$ | 95.50 |
| $SiO_2$ | 3.78 |
| $TiO_2$ | 0.15 |
| $Fe_2O_3$ | 0.06 |
| $Al_2O_3$ | 0.10 |
| $B_2O_3$ | 0.002 |
| $Cr_2O_3$ | 0.002 |
| $La_2O_3$ | 0.01 |
| $CaO$ | 0.12 |
| $Na_2O$ | 0.04 |
| $P_2O_5$ | 0.05 |

For the preparation of the glazed tiles containing each of the pigments indicated in Table I, a typical cone 5 lead glaze composition consisting of

| | Percent |
|---|---|
| Feldspar | 29 |
| $CaCO_3$ (whiting) | 12 |
| $SiO_2$ | 19 |
| Ball clay | 15 |
| $BaCO_3$ | 6 |
| Lead bisilicate | 17 |
| $MgCO_3$ | 2 | was first dry blended. The glaze formulation was then pigmented by ball milling 100 parts by weight of the glaze formula with 10 parts by weight of the particular pigment. The ball milling was in effect a wet grinding process wherein about 100 cc. of water was utilized per 100 grams of the glaze composition. The grinding was conducted for about 2 hours and the pigment containing glaze utilized was all −200 mesh in size. The wet glaze obtained from the ball mill was sprayed on 2⅛" x 4¼" bisque tile, 7 grams of the wet glaze being utilized on one side of tile. Thereafter the tile was fired at 1130° C. for 3 hours.

The color curves for tiles bearing Nos. 19GG, 19AA and 19U are set forth in Fig. 2 and the pigment formulas with respect to the zirconium, silicon and tin oxide contents utilized therein are indicated on Fig. 1 as points J, K and L respectively. Color curves for tiles 15N, 17AA, 14F and 9C are represented in Fig. 3 and the pigment formulations with respect to the zirconium, silicon and tin oxide contents correspond respectively to points N, O, P and Q on Fig. 1. It will be noted that for all tiles the curves are characterized by having a high green component and a relatively lower red component of color.

The compositions of the pigments are broadly limited to those falling within the areas on Fig. 1 previously defined since pigment formulations prepared utilizing proportions falling without these limitations have a definite tendency to increase in intensity of either yellow or blue. For example, tiles prepared as mentioned heretofore only utilizing a pigment having the composition corresponding to point 1 on Fig. 1 have an increase in the amount of yellow reflected. Similar results are obtained when a pigment utilizing the composition represented by point 2 on Fig. 1 is employed. When a pigment high in silica such as that corresponding to point 3 on Fig. 1 is employed, there is a more pronounced bluish cast associated with the pigment.

It is apparent from the description given heretofore that new compound pigments may be produced utilizing as principal reactive ingredients oxides of zirconium, silicon, vanadium and tin by calcining the oxides or compounds productive thereof at temperatures generally ranging from about 1200° C. to 1500° C. The length of time to which a batch containing the reactive oxides is subjected to calcination will of course depend principally upon the quantities employed in the particular batch as well as the type calcining equipment utilized. In general however it may be stated that calcination should be for a period of time sufficient for the batch mixture to attain the desired temperature range and in this regard it has been found in practice that calcination for periods from about 1 to about 5½ hours is normally adequate.

In the claims, the expression "essentially consisting of oxides of zirconium, silicon, vanadium and tin" and similar expressions denote an anlysis of the pigments in terms of the oxides of these elements, indicating a composition wherein such oxides are the components. It will be understood however that such expressions do not signify that in such compositions such oxides are present in the free state nor do they signify anything concerning the state of association of such oxides in the compositions defined.

We claim:

1. A ceramic pigment composition essentially consisting of oxides of zirconium, tin, silicon and vanadium wherein said oxides of zirconium, tin and silicon are present in the relative parts by weight indicated in Fig. 1 as falling within the area defined by lines A—B, B—C, C—D and D—A, and wherein the vanadium oxide is present in amounts ranging from .75% to about 9% $V_2O_5$ by weight of the other oxides mentioned.

2. A ceramic pigment composition essentially consisting of oxides of zirconium, tin, silicon and vanadium wherein said oxides of zirconium, tin and silicon are present in the relative parts by weight indicated in Fig. 1 as falling within the area defined by lines E—F, F—G, G—H and H—E and wherein the vanadium oxide is present in amounts ranging from about 1% to about 5% $V_2O_5$ by weight of the other oxides mentioned.

3. A ceramic pigment composition essentially consisting of a calcined product of the oxides of zirconium, tin, silicon and vanadium wherein said oxides of zirconium, tin and silicon are present in the relative parts by weight as follows:

$ZrO_2$ from 25 to 94
$SnO_2$ from 1 to 60
$SiO_2$ from 5 to 74 and wherein the vanadium oxide is present in amounts ranging from .75% to 9% $V_2O_5$ by weight of the other oxides mentioned.

4. A ceramic pigment composition essentially consisting of a calcined product of the oxides of zirconium, tin, silicon and vanadium wherein said oxides of zirconium, tin and silicon are present in the relative parts by weight as follows:

$ZrO_2$ from 30 to 85
$SnO_2$ from 5 to 50
$SiO_2$ from 10 to 65 and wherein the vanadium oxide is present in amounts ranging from 1% to 5% $V_2O_5$ by weight of the other oxides mentioned.

5. A ceramic pigment composition essentially consisting of oxides of zirconium, tin, silicon and vanadium wherein said oxides have been calcined together in a temperature range from about 1200° C. to about 1500° C., wherein said oxides of zirconium, tin and silicon are present in the relative parts by weight as follows:

$ZrO_2$ from about 25 to about 94
$SnO_2$ from about 1 to about 60
$SiO_2$ from about 5 to about 74 and wherein the vanadium oxide is present in amounts ranging from about .75% to about 9% $V_2O_5$ by weight of the other oxides mentioned.

6. A ceramic pigment composition essentially consisting of oxides of zirconium, tin, silicon and vanadium wherein said oxides have been calcined together in a temperature range from about 1275° C. to about 1375° C., wherein said oxides of zirconium, tin and silicon are present in the relative parts by weight as follows:

$ZrO_2$ from about 30 to about 85
$SnO_2$ from about 5 to about 50
$SiO_2$ from about 10 to about 65 and wherein the vanadium oxide is present in amounts ranging from about 1% to about 5% $V_2O_5$ by weight of the other oxides mentioned.

7. A process for manufacturing a ceramic pigment composition comprising calcining a mixture essentially consisting of compounds of zirconium, tin, silicon and vanadium yielding the oxides thereof during calcination wherein said compounds of zirconium, tin and silicon are present in amounts equivalent to the corresponding oxides ranging in parts by weight as follows:

$ZrO_2$ from about 25 to about 94
$SnO_2$ from about 1 to about 60
$SiO_2$ from about 5 to about 74 and wherein the vanadium compound is present in amounts equivalent from about .75 to about 9% $V_2O_5$ by weight of the other oxides mentioned, said calcination being conducted at from about 1200° C. to about 1500° C.

8. A process of manufacturing a ceramic pigment composition comprising calcining a mixture essentially consisting of compounds of zirconium, tin, silicon and vanadium yielding the oxides thereof during calcination wherein said compounds of zirconium, tin and silicon are present in amounts equivalent to the corresponding oxides ranging in parts by weight as follows:

$ZrO_2$ from about 30 to about 85
$SnO_2$ from about 5 to about 50
$SiO_2$ from about 10 to about 65 and wherein the vanadium compound is present in amounts equivalent from about 1% to about 5% $V_2O_5$ by weight of the other oxides mentioned, said calcination being conducted from about 1275° C. to about 1375° C.

References Cited in the file of this patent

UNITED STATES PATENTS

| | | |
|---|---|---|
| 2,213,168 | Monk | Aug. 27, 1940 |
| 2,389,386 | Russell | Nov. 20, 1945 |
| 2,441,447 | Seabright | May 11, 1948 |

FOREIGN PATENTS

| | | |
|---|---|---|
| 384,473 | Great Britain | Dec. 8, 1932 |

OTHER REFERENCES

Page 13 of the book by George A. Kirkendale entitled "A Textbook for Ceramic Engineers," published by the Alfred University, Alfred, New York 1954.